(12) United States Patent
Pecora et al.

(10) Patent No.: US 8,348,201 B2
(45) Date of Patent: Jan. 8, 2013

(54) ACTUATOR DEVICE BASED ON A SHAPE MEMORY ALLOY, AND A WING FLAP ASSEMBLY FITTED WITH SUCH AN ACTUATOR DEVICE

(75) Inventors: Rosario Pecora, Giugliano (IT); Generoso Iannuzzo, Avellino (IT); Massimo Riccio, Caserta (IT); Salvatore Russo, Quarto (IT); Erika Calvi, Montoro Superiore (IT); Leonardo Lecce, Naples (IT); Silvestro Barbarino, Cicciano (IT); Antonio Concilio, San Nicola La Strada (IT); Salvatore Ameduri, Naples (IT)

(73) Assignee: Alenia Aeronautica S.p.A., Pomigliano D'Arco, Napoli (IT)

( * ) Notice: Subject to any disclaimer, the term of this patent is extended or adjusted under 35 U.S.C. 154(b) by 227 days.

(21) Appl. No.: 12/507,677

(22) Filed: Jul. 22, 2009

(65) Prior Publication Data

US 2010/0019096 A1      Jan. 28, 2010

(30) Foreign Application Priority Data

Jul. 23, 2008 (IT) ............................. TO2008A0566

(51) Int. Cl.
    *B64C 3/58* (2006.01)
(52) U.S. Cl. ........................................ 244/213; 244/219
(58) Field of Classification Search .................. 244/219, 244/213, 214, 199.4, 75 R; 74/469
    See application file for complete search history.

(56) References Cited

U.S. PATENT DOCUMENTS

| 4,806,815 | A | 2/1989 | Honma |
| 5,114,104 | A * | 5/1992 | Cincotta et al. ............... 244/219 |
| 5,150,864 | A | 9/1992 | Roglin et al. |
| 6,123,297 | A * | 9/2000 | Berry ............................ 244/214 |
| 6,138,956 | A | 10/2000 | Monner |
| 6,173,925 | B1 * | 1/2001 | Mueller et al. ................ 244/219 |
| 6,276,641 | B1 | 8/2001 | Gruenewald et al. |
| 2002/0100842 | A1 | 8/2002 | Perez |
| 2005/0103945 | A1 | 5/2005 | Perez-Sanchez |
| 2006/0145029 | A1 * | 7/2006 | Lonsinger ..................... 244/219 |
| 2006/0157623 | A1 * | 7/2006 | Voglsinger et al. ........... 244/219 |
| 2007/0152106 | A9 * | 7/2007 | Perez-Sanchez ............. 244/219 |

FOREIGN PATENT DOCUMENTS

| DE | 199 36 721 A 1 | 2/2001 |
| DE | 101 55 119 A 1 | 5/2003 |

OTHER PUBLICATIONS

Matthew Stubbs, Kinematic Design and Analysis of a Morphing Wing, Dec. 3 2003, Virginia Polytechnic Institute and State University, pp. 15-17.*

* cited by examiner

*Primary Examiner* — Christopher P Ellis
*Assistant Examiner* — Medhat Badawi
(74) *Attorney, Agent, or Firm* — Merchant & Gould P.C.

(57) ABSTRACT

A wing-flap assembly includes a flap made up of a plurality of flap sections, in which each flap section is connected to the preceding one in a rotatable manner, and one or more actuator devices adapted to control the rotation of the flap sections. Each actuator device includes an extended element made of shape memory alloy and an arch-shaped framework made of elastic material, to which the extended element is fixedly connected under tension. Each end of the extended element is fixed to a respective end of the arch-shaped framework. At least one of the actuator devices is connected at one end to the first of the flap sections, and on the other side it is adapted to be connected to a wing structure.

9 Claims, 4 Drawing Sheets

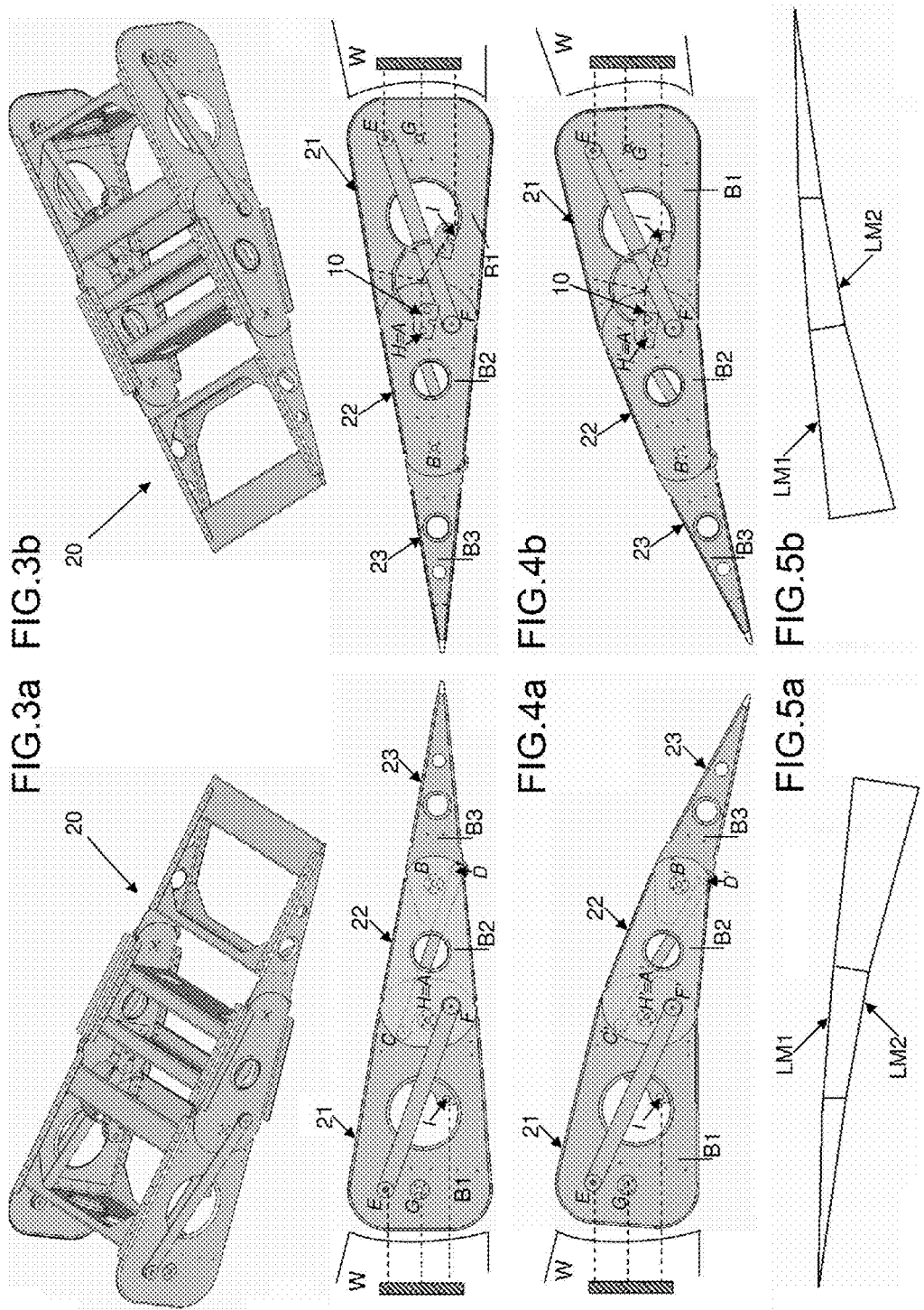

ACTUATOR DEVICE BASED ON A SHAPE MEMORY ALLOY, AND A WING FLAP ASSEMBLY FITTED WITH SUCH AN ACTUATOR DEVICE

This application claims benefit of Italian application Serial No. T2008A000566, filed Jul. 23, 2008, and which application is incorporated herein by reference. To the extent appropriate, a claim of priority is made to the above disclosed application.

The present invention refers to a wing-flap assembly.

As it is known, the increase in lift required for the take-off and landing phases of an aircraft is mainly obtained through the deflection of a wing-flap around an hinge axis.

Such a solution implies the presence of robust control lines and complex actuation devices which significantly contribute to the weight of the whole wing structure.

From an aerodynamic point of view, the local modification of the curvature of the wing airfoil induced by a conventional flap is limited by the excursion range of the flap itself; for this reason only the airfoil curvatures compatible with the finite number of deflection angles of the mobile surface can be used in operating conditions.

The purpose of the present invention is that of providing a wing-flap assembly which allows the weights as well as the operating and maintenance costs to be reduced with respect to conventional wing-flap technology, as well as allowing an optimization of the aerodynamic performances of the lift devices to be obtained.

The object of the invention, is therefore a wing-flap assembly, comprising
- a flap made up of a plurality of flap sections arranged in succession along the transverse direction of the flap, in which each flap section is connected to the preceding one in a limited rotatable manner with respect thereto, in such a manner that the relative rotations of the successive flap sections with respect to the first flap section are in a relation of progressive amplification with respect to it; and
- one or more actuator devices adapted to control the rotation of said flap sections, each actuator device comprising an extended element made of shape memory alloy and an arch-shaped elastic framework, to which the extended element is fixedly connected under tension, each end of the extended element being fixed to a respective end of the arch-shaped framework, in which a controlled heating of the extended element, sufficient to trigger a transformation of the crystalline phase of the shape memory alloy, is capable of causing a contraction of the extended element, and thus a contraction of said arch-shaped framework, and a cooling of the contracted extended element, sufficient to trigger an inverse transformation of the crystalline phase of the shape memory alloy, allows the stretching of the arch-shaped framework due to the elastic return;
in which at least one of said one or more actuator devices is connected on one side to the first of said flap sections, and on the other side it is adapted to be connected to a wing structure.

According to the invention the wing-flap is able to dynamically modify its own curvature (morphing flap) according to specific design requirements. The flap is controlled through one or more actuator devices based upon shape memory alloy, which enormously reduces the total weight of the group and makes the control lines easier to make.

The actuator device based on shape memory alloy has been conceived to comply with the technical requirements of the wing assembly according to the invention. However, it can also be applied in other technological fields, even outside the aircraft industry.

Therefore, a further object of the invention is an actuator device comprising an extended element made of shape memory alloy, also comprising an arch-shaped framework made of elastic material, to which the extended element is fixedly connected under tension, each end of the extended element being fixed to a respective end of the arch-shaped framework, in which a controlled heating of the extended element, sufficient to trigger a transformation of the crystalline phase of the shape memory alloy, is capable of causing a contraction of the extended element, and thus a contraction of said arch-shaped framework, and a cooling of the contracted extended element, sufficient to trigger an inverse transformation of the crystalline phase of the shape memory alloy, allows the arch-shaped framework to stretch due to the elastic return.

Some preferred but not limiting embodiments of the invention shall now be described, with reference to the attached drawings, in which:

FIGS. 3a and 3b are schematic views, from opposite sides, which illustrate a rib of a wing-flap assembly according to a first embodiment of the invention, in a non-deformed configuration;

Figure 6:
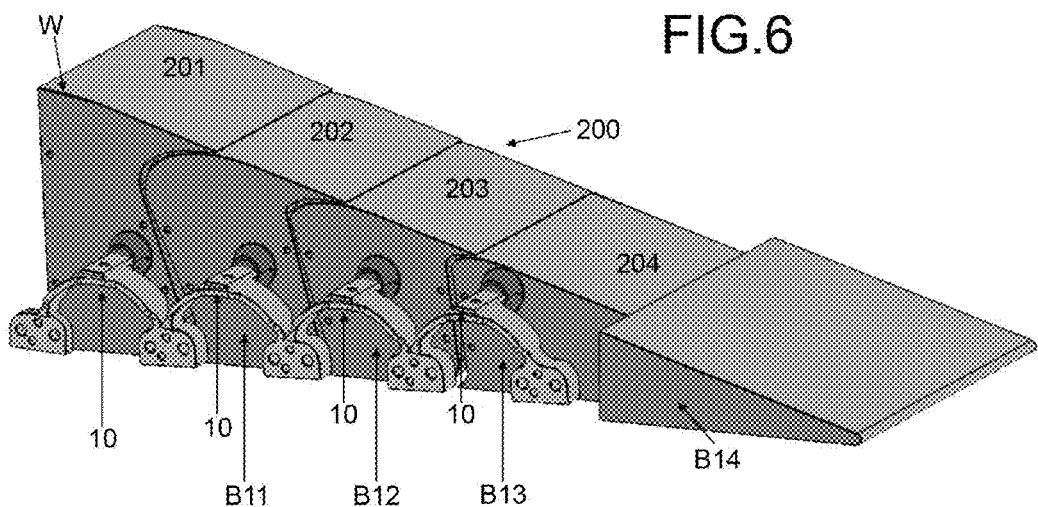
Figure 7:
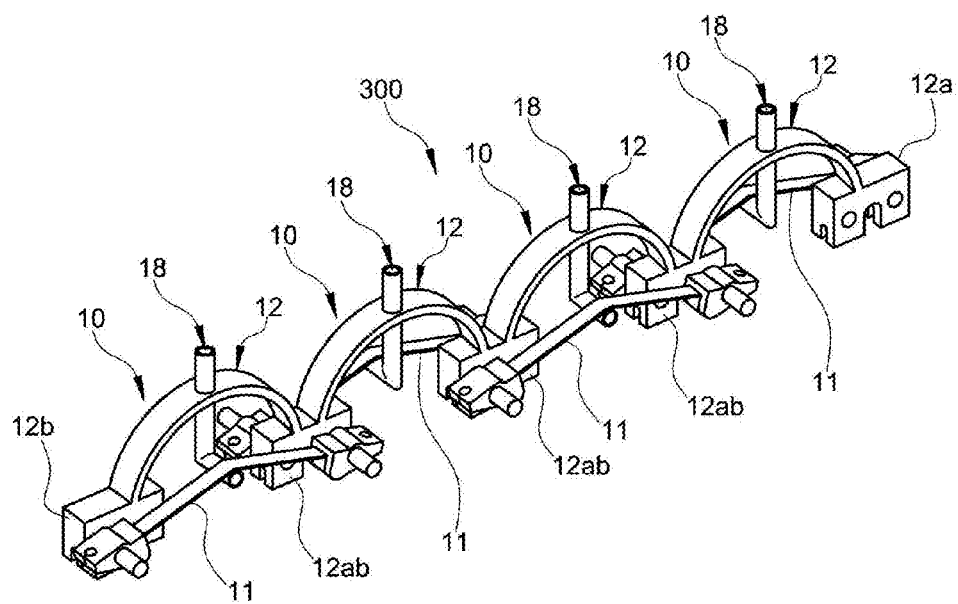
Figure 8:
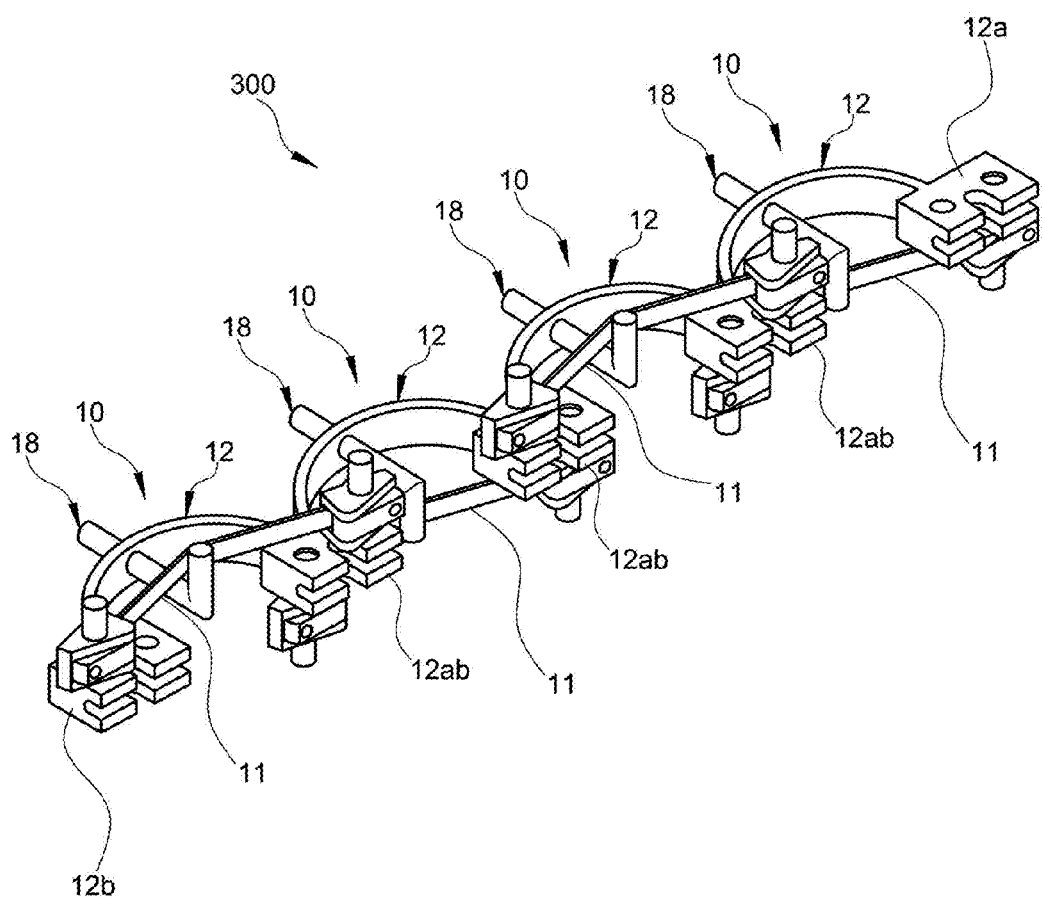

FIGS. 4a and 4b are schematic views, corresponding to those of FIGS. 3a and 3b, which illustrate the rib of FIGS. 3a and 3b in a deformed configuration;

FIGS. 5a and 5b represent the diagram of the rotations of the rib illustrated in FIGS. 3a, 3b, 4a and 4b;

FIG. 6 is a schematic view which illustrates a wing-flap assembly according to a second embodiment of the invention; and FIGS. 7 and 8 are simplified perspective views of a chain of actuator devices used in the rib of FIG. 6.

Figure 1:
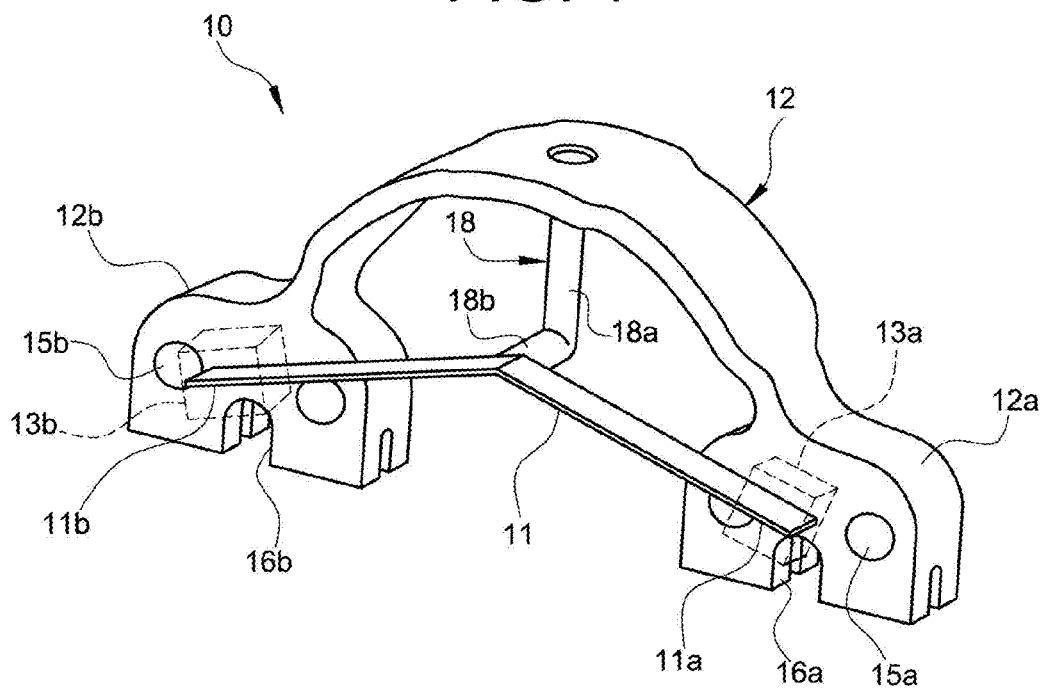
FIG. 1 is a simplified perspective view of an actuator device according to the invention.
Figure 2:
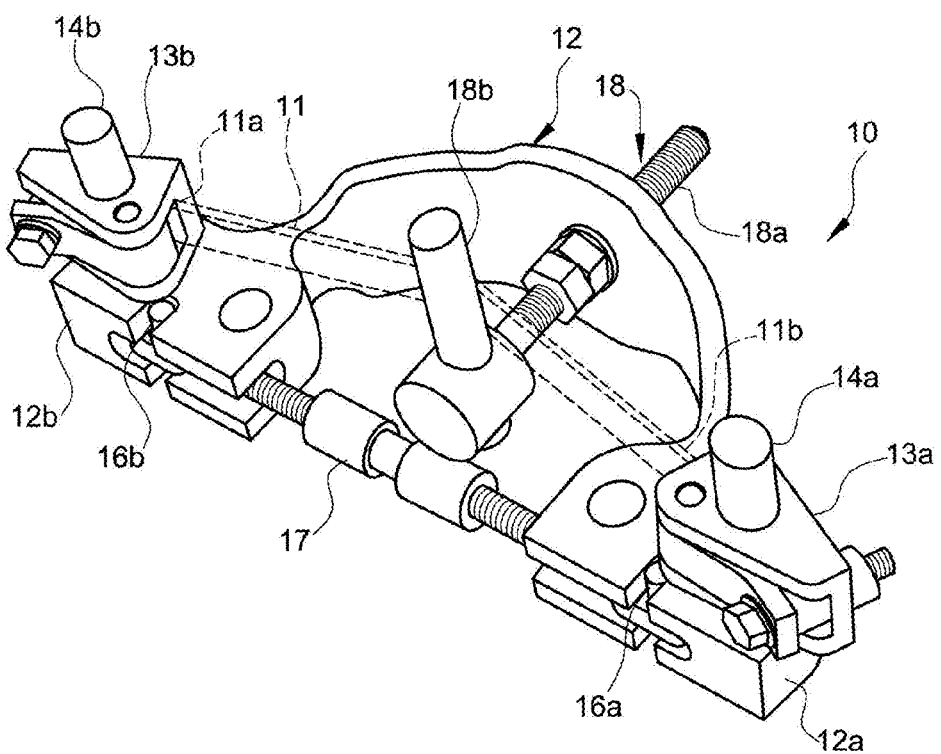
FIG. 2 is a perspective view of a prototype of the device of FIG. 1.

With reference to FIGS. 1 and 2, an actuator device shall now be described according to the invention, wholly indicated with numeral 10. Such a device forms the basis of the wing-flap assembly according to the invention, two embodiments of which shall be described hereafter.

The actuator device 10 comprises an extended element 11 made of shape memory alloy. Such an extended element 11 can have different sizes and geometrical sections (rectangular, circular, etc.); in the example illustrated, it is made in the form of a ribbon having a predetermined length. The actuator device 10 also comprises an arch-shaped framework 12 made of elastic material, in particular a metallic one. Such an arch-shaped framework 12 has thicknesses and is geometrically shaped so as to be able to linearly deform due to the stress exerted by the extended element 11.

In particular, the extended element 11 is fixedly connected to the arch-shaped framework 12 under tension, having each of its ends 11a, 11b fixed to a respective end 12a, 12b of the arch-shaped framework 12. In the example illustrated, the ends 12a, 12b are for this reason provided with respective clamps 13a, 13b, which clamp onto the ends of the extended element 11. Such clamps are rotatably mounted on respective pins 14a, 14b extending perpendicularly with respect to the plane defined by the arch-shaped framework 12, and housed in anchoring holes 15a, 15b. The use of clamps, however, should not be considered to limit the invention, since other fixing means can be conceived to anchor the extended element to the arch-shaped framework, such as, for example, welding.

For the initial assembly of the actuator device, the ends 12a, 12b of the arch-shaped framework 12 are provided with respective anchoring formations 16a, 16b for the temporary assembly of a tensioner 17, with the purpose of creating a preload in the arch-shaped framework (by bringing near the ends of the arch-shaped framework 12) such as to place the extended element under tension when this is anchored to the arch-shaped framework 12, and the tensioner 17 is subsequently removed.

To improve and adjust the tensioning of the extended element 11, in an intermediate position of the arch-shaped framework 12 an adjustment member 18 is provided, comprising a shaft 18a mounted on the arch-shaped framework 12 and oriented in a radial direction, and a support element 18b mounted on the threaded shaft 18a so as to project out transversally from it, on which the extended element 11 rests at an intermediate point. By adjusting the distance of the support element 18b from the arch-shaped framework 12, it is possible to adjust the tensioning of the extended element 11, as well as to increase the performance of the elastic arch. Such an adjustment can be made possible by, for example, providing the shaft 18a with a threading, as visible in FIG. 2.

The operation of the actuator device 10 is based upon known physical principles of shape memory alloys. A controlled heating of the extended element 11, sufficient to trigger a transformation of the crystalline phase of the shape memory alloy, is capable of causing a contraction of the extended element 11, and consequently a contraction of the arch-shaped framework 12 (i.e., the ends 12a, 12b of the framework getting closer to each other). A cooling of the extended element 11 in such a contracted state, sufficient to trigger an inverse transformation of the crystalline phase of the shape memory alloy, allows the arch-shaped framework 12 to stretch (i.e., the ends 12a, 12b of the framework becoming more distant from each other) due to the elastic recoil force exerted by the framework.

With reference to FIGS. 3 to 5, a first embodiment of a wing-flap assembly shall now be described, according to the invention. Such an embodiment is based upon the use of morphologically deformable ribs made up of a plurality of supporting blocks (in the example, three blocks), moveable by means of a quaternary-binary cross linked mechanism (QBCLM).

A wing-flap, indicated as a whole with numeral 20, is formed by a plurality of flap sections 21, 22, 23 arranged in succession along the transverse direction of the flap 20. In reality, in FIGS. 3 and 4 a single rib of the flap 20 is represented, made up of a plurality of blocks B1, B2, B3 connected to one another in a way which shall be described hereafter. Each block B1, B2, B3 of the rib corresponds to a respective flap section 21, 22, 23. In FIGS. 3a and 3b the rib is represented in a non deformed configuration, whereas in FIGS. 4a and 4b the rib is represented in a deformed configuration. Moreover, in FIGS. 3a and 4a the rib is seen according to a view directed towards the tip of the wing, whereas in FIGS. 3b and 4b the rib is seen according to a view directed towards the wing root.

Each block is connected to its successive one through a hinge which lies on the middle line of the flap (points A and B).

The block B1 is connected to the block B3 through shafts hinged at points C and D; the block B2 is connected to the rear spar of the wing W through shafts hinged to the rear spar and to the block B2, at points E and F, respectively.

The block B1 is hinged to the rear spar of the wing W at the point G; at point H, the hinge located on the block B1 is used to connect the block B1 to the actuator device 10. The actuator device 10 is hinged at I to the wing structure W (rear spar) and at H to the block B1.

By heating the extended element 11 of the actuator device 10 it undergoes a predetermined contraction; the block B1 is set into rotation around the hinge G and pulls blocks B2 and B3 along with it; the hinges E, G, I remain integral with the wing structure W whereas the connecting hinges A, B, C, D, F, H modify their own position by shifting into A', B', C', D', F', H', respectively, as illustrated in FIGS. 4a and 4b.

The initial position of the connecting hinges is a function of the family of target curves defined for the middle line of the flap.

FIGS. 5a and 5b represent the middle line of the flap, according to a view directed towards the tip of the wing and a view directed towards the root of the wing, respectively. The line LM1 represents the middle line in the non deformed condition, whereas the line LM2 represents the middle line in the deformed condition.

Due to the particular mechanism as well as the rational positioning of the connecting hinges, small rotations of the block B1 are sufficient to induce large rotations in the successive blocks, with an effect of progressive amplification of the movement from the block B1 towards the block B3. Consequently, even a substantial change in shape of the middle line can be obtained by means of moderate excursions of the actuator device 10, and thus with a low energy consumption.

With reference to FIGS. 6 to 8, a second embodiment of a wing-flap assembly according to the invention shall be described. Such an embodiment is also based upon the use of ribs having variable shapes made up of a plurality of blocks (in the example, four blocks). Such architecture is different from the preceding one in that it integrates a higher number of actuator devices 10, having the function of both structural supports as well as of controlling the deformability of the rib.

A wing-flap, indicated in its entirety with the numeral 200, is formed by a plurality of flap sections 201, 202, 203, 204, arranged in succession along the transverse direction of the flap 200. In FIG. 6 a single rib of the flap 200 is also represented, formed by a plurality of blocks B11, B12, B13, B14 connected to one another through the actuator devices 10. Each block B11, B12, B13, B14 of the rib corresponds to a respective flap section 21, 22, 23, 24.

A possible arrangement of the actuator devices 10 suitable for this wing-flap design is illustrated in FIGS. 7 and 8. Such an arrangement consists of a chain 300 of actuator devices like the one illustrated in FIGS. 1 and 2, in which each actuator device 10 shares an end with the successive actuator device 10. The shared ends of adjacent actuator devices are marked with 12ab in FIGS. 7 and 8. Basically, the chain 300 is made up of actuator devices made integral with one another, in which the bending of the chain is obtained thanks to the deformation of the single actuator devices 10. The blocks B11, B12, B13, B14 are made integral with the ends of the adjacent actuator devices 10. The first actuator device 10 of the chain 300 is at one end made integral with the wing structure W, and at the other it is made integral with the first block B11.

Having multiple actuator devices 10 arranged in series allows an amplification, like in a kinematic chain, of the movements and of the rotations of the single actuator device and their transmission to the successive one, increasing the overall movement and rotation of the rib; moreover, the possibility of singularly activating each actuator device or any combination of them, allows to obtain multiple stable states, which rib deformed shapes are associated to, multiple stable states to be obtained associated with just as many deformed states of the rib, so as to simulate the multiple deflections typical of a conventional flap (according to the foreseen flight conditions). The number of actuator devices connected in series can be modified according to the actuation needs required by the rib and by the available geometrical bulk (which can vary according to the aircraft in question).

Moreover, the arch-shaped devices also represent the single elements of the rib subject to deformation with the modification of the shape thereof, and can therefore be sized to tolerate suitable design tension conditions and the external (aerodynamic) loads.

What is claimed is:

1. A wing-flap assembly, comprising
   a flap having a plurality of flap sections arranged in succession along a transverse direction of the flap, wherein each flap section is connected to the preceding one in a limited rotatable manner with respect thereto, in such a manner that the relative rotations of the successive flap sections with respect to a first flap section are in a relation of progressive amplification with respect to the first flap section; and
   one or more actuator devices adapted to control the rotation of said flap sections, each actuator device comprising an extended element made of shape memory alloy and an arch-shaped framework made of elastic material, to which the extended element is fixedly connected under tension, each end of the extended element being fixed to a respective end of the arch-shaped framework, wherein the extended element extends from a first end of the arch-shaped framework to a second end of the arch-shaped framework, and wherein a controlled heating of the extended element, triggering a transformation of the crystalline phase of the shape memory alloy, is capable of causing a contraction of the extended element, and thus a contraction of said arch-shaped framework, and a cooling of the contracted extended element, triggering an inverse transformation of the crystalline phase of the shape memory alloy, allows the stretching of the arch-shaped framework due to the elastic return;
   wherein at least one of said one or more actuator devices on the first end of the arch-shaped framework is connected to the first of said flap sections, and on the second end of the arch-shaped framework is connectable to a wing structure.

2. Assembly according to claim 1, wherein said flap comprises a plurality of morphologically deformable ribs, each made up of a plurality of blocks arranged in succession and moveable one with respect to the other, each of the blocks of each single rib corresponding to a respective one of said flap sections.

3. Assembly according to claim 2, wherein said blocks are load bearing elements, and wherein the first of said blocks of a single rib is adapted to be hinged to said wing structure, each of the successive blocks being moveable by means of a quaternary-binary cross linked mechanism.

4. Assembly according to claim 2, wherein said actuator devices are load bearing elements, and wherein the first of said blocks of a single rib is adapted to be connected to said wing structure solely by means of a respective of said one or more actuator devices, and said blocks of a single rib are connected to each other solely by means of a respective of said one or more actuator devices.

5. Assembly according to claim 4, wherein said one or more actuator devices are arranged, for each single rib, according to a chain wherein each actuator device is on one side made integral with the subsequent actuator device.

6. Actuator device comprising an extended element made of shape memory alloy, further comprising an arch-shaped framework made of elastic material, to which the extended element is fixedly connected under tension, each end of the extended element being fixed onto a respective end of the arch-shaped framework, wherein the extended element extends from a first end of the arch-shaped framework to a second end of the arch-shaped framework, wherein a controlled heating of the extended element, triggering a transformation of the crystalline phase of the shape memory alloy, is capable of triggering a contraction of the extended element, and thus a contraction of said arch-shaped framework, and a cooling of the contracted extended element, triggering an inverse transformation of the crystalline phase of the shape memory alloy, allows the stretching of the arch-shaped framework due to the elastic return.

7. Device according to claim 6, wherein the ends of the arch-shaped framework are provided with respective anchoring elements for the temporary mounting of a tensioner, adapted to allow the mounting of the extended element under tension.

8. Device according to claim 6, wherein arranged in an intermediate position of the arch-shaped framework is an adjustment member, adapted to adjust the tensioning of the extended element.

9. Device according to claim 8, wherein said adjustment member comprises a support element, laying on which at one of the intermediate positions is the extended element, said support element having an adjustable distance from the arch-shaped framework.

* * * * *